(12) United States Patent
Su et al.

(10) Patent No.: US 11,817,228 B2
(45) Date of Patent: Nov. 14, 2023

(54) WIND-SOLAR REACTOR SYSTEM AND WORKING METHOD THEREOF

(71) Applicant: Xi'an Jiaotong University, Xi'an (CN)

(72) Inventors: Guanghui Su, Xi'an (CN); Yan Zhang, Xi'an (CN); Wenxi Tian, Xi'an (CN); Kui Zhang, Xi'an (CN); Suizheng Qiu, Xi'an (CN); Ronghua Chen, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 485 days.

(21) Appl. No.: 17/190,249

(22) Filed: Mar. 2, 2021

(65) Prior Publication Data

US 2021/0287818 A1  Sep. 16, 2021

(30) Foreign Application Priority Data

Mar. 2, 2020 (CN) .......................... 202010134626.7

(51) Int. Cl.
*G21D 3/00* (2006.01)
*F03D 9/11* (2016.01)
(Continued)

(52) U.S. Cl.
CPC .............. *G21D 3/00* (2013.01); *F01D 15/10* (2013.01); *F01K 7/22* (2013.01); *F01K 11/02* (2013.01); *F03D 9/11* (2016.05); *F22G 1/16* (2013.01); *F24S 20/20* (2018.05); *F24S 23/00* (2018.05); *F24S 60/10* (2018.05); *F24S 60/20* (2018.05); *F24S 60/30* (2018.05); *F24S 80/20* (2018.05); *G21D 1/00* (2013.01); *G21D 3/12* (2013.01); *H02J 2300/22* (2020.01); *H02J 2300/28* (2020.01); *H02J 2300/40* (2020.01); *Y02E 10/76* (2013.01); *Y02E 30/00* (2013.01); *Y02E 60/36* (2013.01)

(58) Field of Classification Search
CPC ... G21D 3/00; G21D 1/00; G21D 3/12; F01D 15/10; F01K 7/22; F01K 11/02;
(Continued)

(56) References Cited

U.S. PATENT DOCUMENTS

2008/0131830 A1* 6/2008 Nix ..................... F24S 10/45
432/220
2010/0176602 A1* 7/2010 Shinnar ................ F03G 6/04
290/1 A
(Continued)

FOREIGN PATENT DOCUMENTS

| CN | 107420878 A | 12/2017 |
|---|---|---|
| CN | 108678915 A | 10/2018 |
| CN | 108988739 A | 12/2020 |

*Primary Examiner* — Mickey H France
(74) *Attorney, Agent, or Firm* — Johnson Dalal; Mark C. Johnson

(57) ABSTRACT

The present disclosure discloses a wind-solar reactor system and a working method thereof. The wind-solar reactor system comprises a nuclear reactor system, a wind power generation system, a solar power storage system and a balance energy system, wherein the nuclear reactor system uses an integrated small modular reactor design, the solar power storage system uses a tower-type solar power storage system design, and a hydrogen production system uses a copper-chlorine cycle hydrogen production technology. A reactor keeps rated full-power operation, generated electricity is adjusted and distributed through a power controller, most of the electricity is used for smoothing the fluctuation of wind power generation, and the excess electricity is used for hydrogen storage of the hydrogen system. Solar power is used for heating saturated steam generated by the reactor into superheated steam through a heater, and then the superheated steam enters a high-pressure cylinder to do work by expansion.

12 Claims, 1 Drawing Sheet

(51) Int. Cl.
   *F24S 60/20* (2018.01)
   *F24S 20/20* (2018.01)
   *F24S 80/20* (2018.01)
   *G21D 3/12* (2006.01)
   *F24S 60/10* (2018.01)
   *F24S 60/30* (2018.01)
   *G21D 1/00* (2006.01)
   *F01K 11/02* (2006.01)
   *F24S 23/00* (2018.01)
   *F01K 7/22* (2006.01)
   *F22G 1/16* (2006.01)
   *F01D 15/10* (2006.01)

(58) Field of Classification Search
   CPC ..... F03D 9/11; F22G 1/16; F24S 20/20; F24S 23/00; F24S 60/10; F24S 60/20; F24S 60/30; F24S 80/20; H02J 2300/22; H02J 2300/28; H02J 2300/40; Y02E 10/76; Y02E 30/00; Y02E 60/36
   See application file for complete search history.

(56) References Cited

U.S. PATENT DOCUMENTS

| | | | | |
|---|---|---|---|---|
| 2010/0202582 A1* | 8/2010 | Shinnar | ................. | G21C 19/28 376/391 |
| 2010/0205856 A1* | 8/2010 | Kubic | ...................... | C25B 1/02 564/69 |
| 2011/0108020 A1* | 5/2011 | McEnerney | ........ | F28D 20/0034 126/640 |
| 2011/0127773 A1* | 6/2011 | Freund | ..................... | F02C 1/05 60/39.182 |
| 2012/0060501 A1* | 3/2012 | Hemrle | ..................... | F02C 6/18 60/659 |
| 2012/0314829 A1* | 12/2012 | Greene | ................ | F28D 20/028 376/322 |
| 2013/0019599 A1* | 1/2013 | Birnbaum | ............... | F03G 6/067 60/641.15 |
| 2013/0049368 A1* | 2/2013 | Kaufmann | ............... | F01D 15/10 290/52 |
| 2013/0056169 A1* | 3/2013 | Stiesdal | ................ | F28D 20/021 165/10 |
| 2013/0285380 A1* | 10/2013 | Afremov | ............... | F01D 15/10 126/714 |
| 2013/0312411 A1* | 11/2013 | Newman | ................ | F24S 60/30 60/641.8 |
| 2014/0138952 A1* | 5/2014 | Marumoto | ............. | F03G 6/065 126/645 |
| 2014/0202447 A1* | 7/2014 | Nadig | .................... | F03G 6/067 126/643 |
| 2015/0096299 A1* | 4/2015 | Sakadjian | .............. | F03G 6/005 60/641.8 |
| 2015/0241137 A1* | 8/2015 | France | .................. | F28D 20/023 165/10 |
| 2016/0047212 A1* | 2/2016 | Vinegar | ................ | F24H 1/0018 166/57 |
| 2016/0109185 A1* | 4/2016 | Middleton | .......... | F28D 20/0039 376/277 |
| 2018/0083449 A1* | 3/2018 | Green | ...................... | H02J 3/28 |
| 2018/0245485 A1* | 8/2018 | Conlon | .................... | F22B 1/006 |
| 2020/0135345 A1* | 4/2020 | Kutsch | .................... | G21D 1/00 |

* cited by examiner

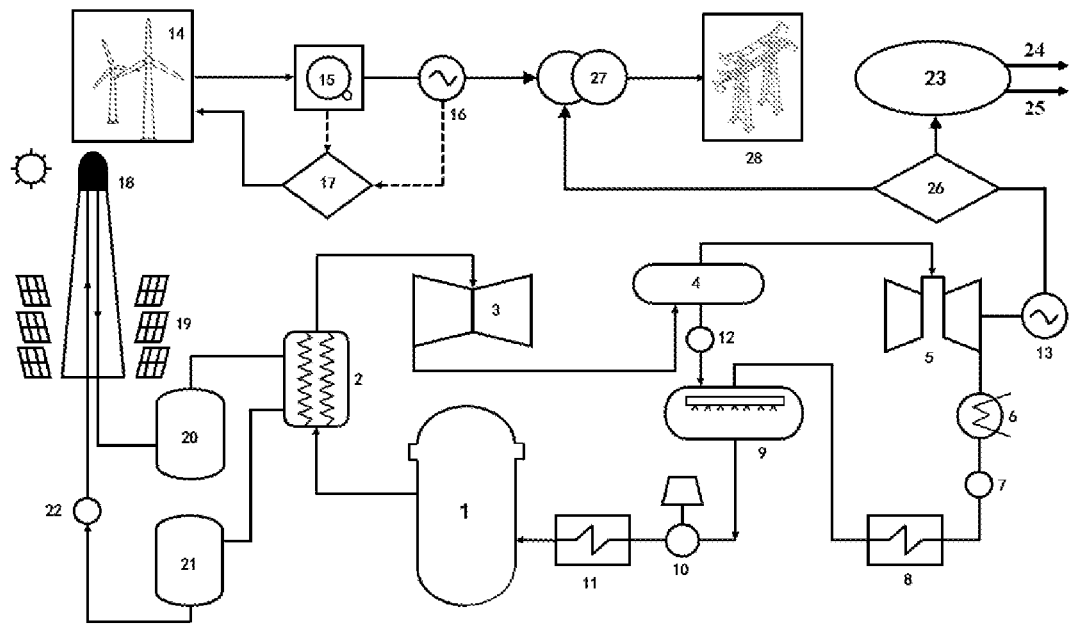

WIND-SOLAR REACTOR SYSTEM AND WORKING METHOD THEREOF

TECHNICAL FIELD

The present disclosure relates to the application field of new energy and renewable energy, in particular to a wind-solar reactor system and a working method thereof.

BACKGROUND

Energy conservation and emission reduction are the urgent needs of the world to cope with climate change. In order to reduce the impact of energy consumption on the environment, it is necessary to further reduce the consumption of fossil energy and increase the development and utilization efficiency of clean and renewable energy sources. However, renewable energy sources, such as solar power and wind power, have the characteristics of randomness, intermittence and fluctuation, which have disadvantages such as difficulty in connection, high cost and difficulty in control when generating electricity into the power grid, and will adversely affect the power quality and reliability of the power grid.

Nuclear energy is an efficient and clean energy source, which is increasingly accepted by the public. Increasing the proportion of nuclear energy in the installed capacity of electricity is one of the effective methods to reduce hazy weather and air pollution in China. However, due to the fluctuation of public acceptance and the vacillation of government policies all over the world, the future of nuclear energy is also full of uncertainties.

Chinese patent application No. CN 201810962441.8 discloses a grid-connected power generation system of combining a nuclear reactor with wind power and solar photovoltaic power. The system comprises three power generation modules: a nuclear reactor module, a wind power generation module and a solar photovoltaic power generation module. The generated power is collected in a power controller, transformed by a transformer and delivered to the power grid. The system is designed to solve the disturbance of wind power and solar power generation to the power grid. In the present disclosure, the stability of input power in the power grid is realized by using a plurality of regulators to adjust the output power of the reactor according to the fluctuation of wind power and solar power. On the one hand, the method needs to balance the output of three kinds of energy sources, and has high requirements on the capacity of the regulating system. At present, this type of regulating systems is still in the primary research stage, and further research is needed to achieve engineering application. On the other hand, in this method, the power of the nuclear reactor needs to be constantly adjusted, and it cannot operate at rated power for a long time, which reduces the economy of the expensive nuclear reactor.

SUMMARY

In order to solve the problems existing in the prior art, the present disclosure provides a wind-solar reactor system and a working method thereof, which combines the three energy sources of nuclear energy, wind power and solar power, and achieves the maximum energy utilization rate while solving the problem of disturbance of power generation with wind power, solar power and other renewable energy sources to a power grid.

In order to achieve the above purpose, the present disclosure adopts the following technical scheme:

a wind-solar reactor system, comprising a nuclear reactor system, a wind power generation system, a solar power storage system and a balance energy system, wherein the nuclear reactor system comprises a reactor 1, a superheater 2, a high-pressure cylinder 3, a steam-water separation reheater 4, a low-pressure cylinder 5, a condenser 6, a condensate pump 7, a low-pressure heater 8, a deaerator 9, a feed water pump 10, a high-pressure heater 11 and a nuclear power generator 13, the reactor core outlet of the reactor 1 is communicated with the shell side steam inlet of the superheater 2 through a pipeline, the shell side steam outlet of the superheater 2 is communicated with the steam inlet of the high-pressure cylinder 3, the steam outlet of the high-pressure cylinder 3 is communicated with the steam inlet of the steam-water separation reheater 4, the steam outlet of the steam-water separation reheater 4 is communicated with the steam inlet of the low-pressure cylinder 5, the liquid outlet of the steam-water separation reheater 4 is communicated with the water inlet of the deaerator 9 through a drain pump 12, the steam outlet of the low-pressure cylinder 5 is connected with the inlets of the condenser 6, the condensate pump 7 and the low-pressure heater 8 in sequence, the outlet of the low-pressure heater 8 is communicated with another water inlet of the deaerator 9, the outlet of the deaerator 9 is connected with the inlets of feed water pump 10 and the high-pressure heater 11 in sequence, the outlet of high-pressure heater 11 is communicated with the inlet of the reactor 1, the high-pressure cylinder 3 and the low-pressure cylinder 5 are connected with a nuclear power generator 13 through bearings, respectively; the solar power storage system consists of a solar absorber 18, a heliostat 19, a high-temperature molten salt tank 20, a low-temperature molten salt tank 21 and a molten salt pump 22, the heliostat 19 is arranged outside the solar absorber 18, the outlet of the solar absorber 18 is communicated with the inlet of the high-temperature molten salt tank 20 through a molten salt pipeline, the outlet of the high-temperature molten salt tank 20 is communicated with the tube-side molten salt inlet of the superheater 2, the tube-side molten salt outlet of the superheater 2 is connected with the inlets of the low-temperature molten salt tank 21 and the molten salt pump 22 in sequence, the outlet of the molten salt pump 22 is communicated with the inlet of the solar absorber 18; the wind power generation system comprises a fan 14, a speed increaser 15, a wind turbine 16 and a control system 17, wherein the fan 14 is connected with the speed increaser 15 through bearings, the speed increaser 15 is connected with the wind turbine 16 through bearings, there are signal paths between the control system 17 and the fan 14, and between the speed increaser 15 and the wind turbine 16; the nuclear power generator 13 is connected with the inlet of a power controller 26 through a power path, two outlets of the power controller 26 are connected with a balance energy system and an inlet of a transformer 27, respectively, the wind turbine 16 is connected with the other inlet of the transformer 27, and the outlet of the transformer 27 is connected with a power grid 28.

The superheater 2 is a shell-and-tube heat exchanger, the molten salt in the low-temperature molten salt tank 21 is driven by a molten salt pump 22 to enter the solar absorber 18 and then enters the tube side of the superheater 2 through the high-temperature molten salt tank 20 after being heated, saturated steam generated in the reactor 1 enters the shell side of the superheater 2 and then enters the high-pressure cylinder 3 to do work after being heated by the high-temperature molten salt on the tube side to become superheated steam, and the molten salt cooled on the tube side returns to the low-temperature molten salt tank 21; superheated steam enters the steam-water separation reheater 4 after entering the high-pressure cylinder 3 to do work, the separated liquid water enters the deaerator 9 through the drain pump 12, the remaining gas continues to enter the low-pressure cylinder 5 to do work, the low-pressure and low-temperature steam discharged from the low-pressure cylinder 5 enters the condenser 6 to condense into liquid water, which is driven by the condensate pump 7 and enters the low-pressure heater 8 to be heated, the heated liquid and the liquid separated from the steam-water separation reheater 4 enter the deaerator 9 together for deaeration, and then are driven by the feed water pump 10 to enter the high-pressure heater 11 to be heated to a predetermined temperature, enter the reactor 1 to cool the reactor core, and are heated into saturated steam at the same time to enter the superheater 2; the work done by the high-pressure cylinder 3 and the low-pressure cylinder 5 is used for the nuclear power generator 13 to generate electricity; the fan 14 is driven by wind power to do work and is used for the wind turbine 16 to generate electricity after being accelerated by the speed increaser 15, the control system 17 partially adjusts the fluctuation of wind power generation according to the feedback action; the power controller 26 distributes the electricity generated by the nuclear power generator 13, most of which is used for smoothing the fluctuation of power generation of the wind turbine, the electricity is combined with the electricity generated by wind and then enters a power grid 28 after being transformed by a transformer 27, the other part of the remaining electricity is used for the balance energy system to perform copper-chlorine cycle hydrogen production or seawater desalination or bioenergy product production.

Preferably, the reactor 1 uses integrated small modular reactors (SMR), the number of which may be one or more. The more the number, the lower the economy may be, but the effect of smoothing the random fluctuation of wind power generation is better. In practical application, it is necessary to comprehensively consider the factors such as the wind speed situation all the year round (corresponding wind power output situation), the construction cost of the integrated small modular reactor (SMR) unit, the rated power of a single integrated small modular reactor (SMR) unit, and the ratio of the total power generated by the reactor to the compensation power required for wind power generation.

Preferably, the solar power storage system uses a tower-type solar power storage system, a solar absorber 18 is fixed on the top of the tower, a preset number of heliostats 19 are installed around the tower, high temperature is generated into the wall of the solar absorber 18 collecting sunlight on the top of the tower by the heliostat 19 to heat molten salt through the solar absorber 18.

Preferably, the balance energy system is a hydrogen production system 23 and its auxiliary components or a seawater desalination device or a biomass energy storage system.

Preferably, the hydrogen production system 23 uses a copper-chlorine cycle hydrogen production technology.

As a preferred embodiment of the present disclosure, in the system, the reactor 1 keeps the rated full power for operation, a part of heat is used to drive the high-pressure cylinder 3 and the low-pressure cylinder 5 to work, and the generated electricity is used to smooth the fluctuation of wind power generation, and is also used for copper-chlorine cycle hydrogen production, thus improving the effective utilization rate of nuclear power. The solar power storage system transfers the absorbed solar heat to the saturated steam generated by the integrated small modular reactor (SMR) through the superheater 2. The saturated steam becomes superheated steam after passing through the superheater 2, and enters the high-pressure cylinder 3 to do work by expansion. As the steam temperature rises, the power generation efficiency of the reactor is improved to a certain extent. With the introduction of the solar power storage system with random fluctuation, nuclear power generation not only improves the power generation efficiency, but also smoothes the random fluctuation of wind power generation. The electricity generated by the nuclear power generator 13 is adjusted and distributed by the power controller 26. Most of the electricity combined with the electricity generated by the wind power generation system is used for power supply to the demand side, and the excess electricity is used for the balance energy system to perform copper-chlorine cycle hydrogen production or seawater desalination or bioenergy product production.

Compared with the prior art, the present disclosure has the following advantages.

1. According to the present disclosure, solar power is not used for direct power generation, but for heating saturated steam at the outlet of the reactor to superheat, which not only improves the power generation efficiency of nuclear energy, but also reduces the types of energy to be controlled by the power controller and reduces the control difficulty.

2. According to the present disclosure, the reactor in the present disclosure adopts an integrated small modular reactor, which avoids water loss accidents caused by pipeline breaks, reduces the melting probability of the reactor core and improves the inherent safety of the reactor; at the same time, it also has the advantages of low cost, high modularity and wide application range.

3. According to the present disclosure, the reactor operates at the rated full power, and the generated power is used for smoothing wind power generation fluctuation and producing hydrogen at the same time, so that the reactor economy is greatly improved.

4. According to the present disclosure, the energy balance system adopts a hydrogen production system. In fact, other thermal energy systems, such as a seawater desalination device and a biomass energy storage system, can also be adopted according to actual use, which has the advantages of high flexibility and adaptability.

BRIEF DESCRIPTION OF THE DRAWINGS

FIG. 1 is a schematic diagram of the wind-solar reactor system according to the present disclosure.

In the FIGURE: 1-nuclear reactor; 2-superheater; 3-high-pressure cylinder; 4-steam-water separation reheater; 5-low-pressure cylinder; 6-condenser; 7-condensate pump; 8-low-pressure heater; 9-deaerator; 10-feed water pump; 11-high-pressure heater; 12-drain pump; 13-nuclear power generator; 14-fan; 15-speed increaser; 16-wind turbine; 17-control system; 18-solar absorber; 19-heliostat; 20-high-temperature molten salt tank; 21-low-temperature molten salt tank; 22-molten salt pump; 23-hydrogen production system; 24-hydrogen delivery pipeline; 25-oxygen delivery pipeline; 26-power controller; 27-transformer; 28-power grid.

DETAILED DESCRIPTION

The present disclosure will be described in detail with reference to the drawings and embodiments.

As shown in FIG. 1, the wind-solar reactor system of the present disclosure mainly comprises a nuclear reactor system, a wind power generation system, a solar power storage system and a balance energy system. The nuclear reactor system comprises a reactor 1, a superheater 2, a high-pressure cylinder 3, a steam-water separation reheater 4, a low-pressure cylinder 5, a condenser 6, a condensate pump 7, a low-pressure heater 8, a deaerator 9, a feed water pump 10, a high-pressure heater 11 and a nuclear power generator 13. The reactor core outlet of the reactor 1 is communicated with the shell side steam inlet of the superheater 2 through a pipeline. The shell side steam outlet of the superheater 2 is communicated with the steam inlet of the high-pressure cylinder 3. The steam outlet of the high-pressure cylinder 3 is communicated with the steam inlet of the steam-water separation reheater 4. The steam outlet of the steam-water separation reheater 4 is communicated with the steam inlet of the low-pressure cylinder 5. The liquid outlet of the steam-water separation reheater 4 is communicated with the water inlet of the deaerator 9 through a drain pump 12. The steam outlet of the low-pressure cylinder 5 is connected with the inlets of the condenser 6, the condensate pump 7 and the low-pressure heater 8 in sequence. The outlet of the low-pressure heater 8 is communicated with another water inlet of the deaerator 9. The outlet of the deaerator 9 is connected with the inlets of feed water pump 10 and the high-pressure heater 11 in sequence. The outlet of high-pressure heater 11 is communicated with the inlet of the reactor 1. The high-pressure cylinder 3 and the low-pressure cylinder 5 are connected with a nuclear power generator 13 through bearings, respectively. The solar power storage system consists of a solar absorber 18, a heliostat 19, a high-temperature molten salt tank 20, a low-temperature molten salt tank 21 and a molten salt pump 22. The heliostat 19 is arranged outside the solar absorber 18. The outlet of the solar absorber 18 is communicated with the inlet of the high-temperature molten salt tank 20 through a molten salt pipeline. The outlet of the high-temperature molten salt tank 20 is communicated with the tube-side molten salt inlet of the superheater 2. The tube-side molten salt outlet of the superheater 2 is connected with the inlets of the low-temperature molten salt tank 21 and the molten salt pump 22 in sequence. The outlet of the molten salt pump 22 is communicated with the inlet of the solar absorber 18. The wind power generation system comprises a fan 14, a speed increaser 15, a wind turbine 16 and a control system 17. The fan 14 is connected with the speed increaser 15 through bearings. The speed increaser 15 is connected with the wind turbine 16 through bearings. There are signal paths between the control system 17 and the fan 14, and between the speed increaser 15 and the wind turbine 16. In this embodiment, the energy balance system consists of a hydrogen production system 23 and auxiliary components. The nuclear power generator 13 is connected with the inlet of a power controller 26 through a power path. Two outlets of the power controller 26 are connected with the hydrogen production system 23 and an inlet of a transformer 27, respectively. The wind turbine 16 is connected with the other inlet of the transformer 27, and the outlet of the transformer 27 is connected with a power grid 28.

The superheater 2 is a shell-and-tube heat exchanger. The molten salt in the low-temperature molten salt tank 21 is driven by a molten salt pump 22 to enter the solar absorber 18 and then enters the tube side of the superheater 2 through the high-temperature molten salt tank 20 after being heated. Saturated steam generated in the reactor 1 enters the shell side of the superheater 2 and then enters the high-pressure cylinder 3 to do work after being heated by the high-temperature molten salt on the tube side to become superheated steam, and the molten salt cooled on the tube side returns to the low-temperature molten salt tank 21.

Superheated steam enters the steam-water separation reheater 4 after entering the high-pressure cylinder 3 to do work. The separated liquid water enters the deaerator 9 through the drain pump 12. The remaining gas continues to enter the low-pressure cylinder 5 to do work. The low-pressure and low-temperature steam discharged from the low-pressure cylinder 5 enters the condenser 6 to condense into liquid water, which is driven by the condensate pump 7 and enters the low-pressure heater 8 to be heated. The heated liquid and the liquid separated from the steam-water separation reheater 4 enter the deaerator 9 together for deaeration, and then are driven by the feed water pump 10 to enter the high-pressure heater 11 to be heated to a predetermined temperature, enter the reactor 1 to cool the reactor core, and are heated into saturated steam at the same time to enter the superheater 2. The work done by the high-pressure cylinder 3 and the low-pressure cylinder 5 is used for the nuclear power generator 13 to generate electricity;

The fan 14 is driven by wind power to do work and is used for the wind turbine 16 to generate electricity after being accelerated by the speed increaser 15. The control system 17 partially adjusts the fluctuation of wind power generation according to the feedback action.

The power controller 26 distributes the electricity generated by the nuclear power generator 13, most of which is used for smoothing the fluctuation of power generation of the wind turbine. The electricity is combined with the electricity generated by wind and then enters a power grid 28 after being transformed by a transformer 27. The other part of the remaining electricity is used for hydrogen production and hydrogen storage in the hydrogen production system 23.

In this example, the reactor 1 uses integrated small modular reactors (SMR). The solar power storage system uses a tower-type solar power storage system. A solar absorber 18 is fixed on the top of the tower. A certain number of heliostats 19 are installed around the tower. High temperature is generated into the wall of the solar absorber 18 collecting sunlight on the top of the tower by the heliostat 19 to heat molten salt through the solar absorber 18. The hydrogen production system 23 uses a copper-chlorine cycle hydrogen production technology.

In the actual operation of this example, SMR 1 keeps the rated full power for operation. A part of heat is used to drive the high-pressure cylinder 3 and the low-pressure cylinder 5 to work. The generated electricity is used to smooth the fluctuation of wind power generation, and is also used for copper-chlorine cycle hydrogen production, thus improving the effective utilization rate of nuclear power. The solar power storage system transfers the absorbed solar heat to the saturated steam generated by the SMR through the superheater 2. The saturated steam becomes superheated steam after passing through the superheater 2, and enters the high-pressure cylinder 3 to do work by expansion. As the steam temperature rises, the power generation efficiency of the reactor is improved to a certain extent. With the introduction of the solar power storage system with random fluctuation, nuclear power generation not only improves the power generation efficiency, but also smoothes the random fluctuation of wind power generation. The electricity generated by the nuclear power generator 13 is adjusted and distributed by the power controller 26. Most of the electricity combined with the electricity generated by the wind power generation system is used for power supply to the demand side, and the excess electricity is used for hydrogen production and hydrogen storage in the hydrogen production system 23.

In this example, the energy balance system adopts hydrogen production device, but in fact, other thermal energy systems such as a seawater desalination device and a biomass energy storage system can be adopted according to actual use.

The above is a further detailed description of the present disclosure combined with specific preferred embodiments, and it cannot be considered that the specific embodiments of the present disclosure are limited thereto. For those skilled in the technical field to which the present disclosure belongs, as long as it is within the scope of the essential spirit of the present disclosure, the changes and modifications of the above embodiments should be regarded as within the scope of the claims of the present disclosure.

What is claimed is:

1. A wind-solar reactor system comprising:
    a balance energy system;
    a nuclear reactor system with a reactor, a superheater, a high-pressure cylinder, a steam-water separation reheater, a low-pressure cylinder, a condenser, a condensate pump, a low-pressure heater, a deaerator, a feed water pump, a high-pressure heater, and a nuclear power generator, wherein a reactor core outlet of the reactor is communicated with a shell side steam inlet of the superheater through a pipeline, the shell side steam outlet of the superheater is communicated with a steam inlet of the high-pressure cylinder, a steam outlet of the high-pressure cylinder is communicated with a steam inlet of the steam-water separation reheater, a steam outlet of the steam-water separation reheater is communicated with a steam inlet of the low-pressure cylinder, a liquid outlet of the steam-water separation reheater is communicated with a water inlet of the deaerator through a drain pump, a steam outlet of the low-pressure cylinder is connected with inlets of the condenser, the condensate pump and the low-pressure heater are in sequence, an outlet of the low-pressure heater is communicated with another water inlet of the deaerator, an outlet of the deaerator is connected with inlets of the feed water pump and the high-pressure heater in sequence, an outlet of the high-pressure heater is communicated with an inlet of the reactor, the high-pressure cylinder and the low-pressure cylinder are connected with the nuclear power generator (13) through bearings, respectively, the nuclear power generator is connected with an inlet of a power controller through a power path, two outlets of the power controller are connected with a balance energy system and an inlet of a transformer, respectively;
    a wind power generation system with a fan, a speed increaser, a wind turbine, and a control system, wherein the fan is connected with the speed increaser through bearings, the speed increaser is connected with the wind turbine through bearings, there are signal paths between the control system and the fan and between the speed increaser and the wind turbine, and the wind turbine is connected with another inlet of the transformer, and an outlet of the transformer is connected with a power grid; and
    a solar power storage system with a solar absorber, a heliostat, a high-temperature molten salt tank, a low-temperature molten salt tank, and a molten salt pump, the heliostat is arranged outside the solar absorber, an outlet of the solar absorber is communicated with an inlet of the high-temperature molten salt tank through a molten salt pipeline, an outlet of the high-temperature molten salt tank is communicated with a tube-side molten salt inlet of the superheater, a tube-side molten salt outlet of the superheater is connected with inlets of the low-temperature molten salt tank and a molten salt pump in sequence, an outlet of the molten salt pump is communicated with an inlet of the solar absorber.

2. The wind-solar reactor system according to claim 1, wherein the reactor uses integrated small modular reactors (SMR), the number of which is one or more.

3. The wind-solar reactor system according to claim 1, wherein the solar power storage system uses a tower-type solar power storage system, a solar absorber is fixed on the top of the tower, a preset number of heliostats are installed around the tower, high temperature is generated into the wall of the solar absorber collecting sunlight on the top of the tower by the heliostat to heat molten salt through the solar absorber.

4. The wind-solar reactor system according to claim 1, wherein the balance energy system is a hydrogen production system and its auxiliary components or a seawater desalination device or a biomass energy storage system.

5. The wind-solar reactor system according to claim 4, wherein the hydrogen production system uses a copper-chlorine cycle hydrogen production technology.

6. The wind-solar reactor system according to claim 1, wherein in the system, the reactor keeps the rated full power for operation, a part of heat is used to drive the high-pressure cylinder and the low-pressure cylinder to work, and the generated electricity is used to smooth the fluctuation of wind power generation, and is also used for the balance energy system to perform copper-chlorine cycle hydrogen production or seawater desalination or bioenergy product production, thus improving the effective utilization rate of nuclear power.

7. A working method of the wind-solar reactor system according to claim 1, comprising
    providing a balance energy system with:
        a nuclear reactor system with a reactor, a superheater is a shell-and-tube heat exchanger, a high-pressure cylinder, a steam-water separation reheater, a low-pressure cylinder, a condenser, a condensate pump, a low-pressure heater, a deaerator, a feed water pump, a high-pressure heater, and a nuclear power generator, wherein a reactor core outlet of the reactor is communicated with a shell side steam inlet of the superheater through a pipeline, the shell side steam outlet of the superheater is communicated with a steam inlet of the high-pressure cylinder, a steam outlet of the high-pressure cylinder is communicated with a steam inlet of the steam-water separation reheater, a steam outlet of the steam-water separation reheater is communicated with a steam inlet of the low-pressure cylinder, a liquid outlet of the steam-water separation reheater is communicated with a water inlet of the deaerator through a drain pump, a steam outlet of the low-pressure cylinder is connected with inlets of the condenser, the condensate pump and the low-pressure heater are in sequence, an outlet of the low-pressure heater is communicated with another water inlet of the deaerator, an outlet of the deaerator is connected with inlets of the feed water pump and the high-pressure heater in sequence, an outlet of the high-pressure heater is communicated with an inlet of the reactor, the high-pressure cylinder and the low-pressure cylinder are connected with the nuclear power generator through bearings, respectively, the nuclear power generator is connected with an inlet of a power controller through a power path, two outlets of the power controller are connected with a balance energy system and an inlet of a transformer, respectively;

a wind power generation system with a fan, a speed increaser, a wind turbine, and a control system, wherein the fan is connected with the speed increaser through bearings, the speed increaser is connected with the wind turbine through bearings, there are signal paths between the control system and the fan and between the speed increaser and the wind turbine, and the wind turbine is connected with another inlet of the transformer, and an outlet of the transformer is connected with a power grid; and a solar power storage system with a solar absorber, a heliostat, a high-temperature molten salt tank, a low-temperature molten salt tank, and a molten salt pump, the heliostat is arranged outside the solar absorber, an outlet of the solar absorber is communicated with an inlet of the high-temperature molten salt tank through a molten salt pipeline, an outlet of the high-temperature molten salt tank is communicated with a tube-side molten salt inlet of the superheater, a tube-side molten salt outlet of the superheater is connected with inlets of the low-temperature molten salt tank and a molten salt pump in sequence, an outlet of the molten salt pump is communicated with an inlet of the solar absorber;

driving a molten salt in the low-temperature molten salt tank by the molten salt pump to enter the solar absorber and then entering the tube side of the superheater through the high-temperature molten salt tank after being heated, with saturated steam generated in the reactor entering the shell side of the superheater and then entering the high-pressure cylinder to do work after being heated by the high-temperature molten salt on the tube side to become superheated steam, then the molten salt cooled on the tube side returns to the low-temperature molten salt tank, the superheated steam entering the steam-water separation reheater after entering the high-pressure cylinder to do work, the separated liquid water enters the deaerator through the drain pump, the remaining gas continues to enter the low-pressure cylinder to do work, the low-pressure and low-temperature steam discharged from the low-pressure cylinder enters the condenser to condense into liquid water, which is driven by the condensate pump and then enters the low-pressure heater to be heated, the heated liquid and the liquid separated from the steam-water separation reheater enter the deaerator together for deaeration, and then are driven by the feed water pump to enter the high-pressure heater to be heated to a predetermined temperature, enter the reactor to cool the reactor core, and are heated into saturated steam at the same time to enter the superheater;

using the work done by the high-pressure cylinder and the low-pressure cylinder for the nuclear power generator to generate electricity;

driving the fan by wind power to do work and is used for the wind turbine to generate electricity after being accelerated by the speed increaser, partially adjusting, by the control system, the fluctuation of wind power generation according to the feedback action; and distributing, by the power controller, the electricity generated by the nuclear power generator, most of which is used for smoothing the fluctuation of power generation of the wind turbine, the electricity is combined with the electricity generated by wind and then enters a power grid after being transformed by a transformer, the other part of the remaining electricity is used for the balance energy system to perform copper-chlorine cycle hydrogen production or seawater desalination or bioenergy product production.

8. The working method of the wind-solar reactor system according to claim 7, wherein the reactor uses integrated small modular reactors (SMR), the number of which is one or more.

9. The working method of the wind-solar reactor system according to claim 7, wherein the solar power storage system uses a tower-type solar power storage system, a solar absorber is fixed on the top of the tower, a preset number of heliostats are installed around the tower, high temperature is generated into the wall of the solar absorber collecting sunlight on the top of the tower by the heliostat to heat molten salt through the solar absorber.

10. The working method of the wind-solar reactor system according to claim 7, wherein the balance energy system is a hydrogen production system and its auxiliary components or a seawater desalination device or a biomass energy storage system.

11. The working method of the wind-solar reactor system according to claim 10, wherein the hydrogen production system uses a copper-chlorine cycle hydrogen production technology.

12. The working method of the wind-solar reactor system according to claim 7, wherein the reactor keeps the rated full power for operation, a part of heat is used to drive the high-pressure cylinder and the low-pressure cylinder to work, and the generated electricity is used to smooth the fluctuation of wind power generation, and is also used for the balance energy system to perform copper-chlorine cycle hydrogen production or seawater desalination or bioenergy product production, thus improving the effective utilization rate of nuclear power.

* * * * *